United States Patent [19]
Delgado et al.

[11] Patent Number: 5,508,313
[45] Date of Patent: Apr. 16, 1996

[54] TACKY MICROSPHERES HAVING PENDANT HYDROPHILIC POLYMERIC OR OLIGOMERIC MOIETIES

[75] Inventors: Joaquin Delgado, Stillwater; Richard J. Goetz, Woodbury; Spencer F. Silver, White Bear Lake, all of Minn.

[73] Assignee: Minnesota Mining and Manufacturing Company, Saint Paul, Minn.

[21] Appl. No.: 333,362

[22] Filed: Nov. 2, 1994

Related U.S. Application Data

[63] Continuation of Ser. No. 989,101, Dec. 11, 1992, abandoned.

[51] Int. Cl.$^6$ .................................. C08J 9/28; B32B 7/12
[52] U.S. Cl. ........................... 521/63; 428/40; 428/317.5; 428/355; 428/402; 428/511; 521/64; 521/149; 523/201; 524/548; 524/555; 524/558; 524/801; 524/811; 524/83; 524/833; 524/903; 525/246; 525/279; 525/296; 525/301; 525/303; 525/902; 526/91; 526/306; 526/312; 526/318; 526/318.4; 526/333; 526/909; 526/911; 526/931
[58] Field of Search ..................... 428/40, 317.5, 428/355, 402, 511; 521/63, 64, 149; 523/201; 524/801, 811, 831, 833, 548, 558, 555, 903; 525/246, 279, 296, 303, 301, 902; 526/91, 306, 312, 318, 909, 911, 931, 318.4, 333

[56] References Cited

U.S. PATENT DOCUMENTS

| | | | |
|---|---|---|---|
| 2,532,011 | 11/1950 | Dahlquist et al. | 428/40 |
| 2,607,711 | 8/1952 | Hendricks | 428/40 |
| 3,318,852 | 5/1967 | Dixon | 428/341 |
| 3,691,140 | 9/1972 | Silver | 526/240 |
| 3,890,282 | 6/1975 | Heilman | 526/271 |
| 3,891,584 | 6/1975 | Ray-Chaudhuri et al. | 525/63 |
| 4,166,152 | 8/1979 | Baker et al. | 428/522 |
| 4,442,258 | 4/1984 | Sunakawa et al. | 524/767 |
| 4,645,783 | 2/1987 | Kinoshita | 523/221 |
| 4,656,218 | 4/1987 | Kinoshita | 524/460 |
| 5,045,569 | 9/1991 | Delgado | 521/60 |
| 5,086,142 | 2/1992 | Fock et al. | 526/333 |
| 5,162,475 | 11/1992 | Tang et al. | 526/333 |
| 5,219,900 | 6/1993 | Davies et al. | 523/201 |

FOREIGN PATENT DOCUMENTS

| | | |
|---|---|---|
| 0269420 | 6/1988 | European Pat. Off. . |
| 0371635 | 6/1990 | European Pat. Off. . |
| 0444254 | 9/1991 | European Pat. Off. . |
| 9306184 | 4/1993 | WIPO . |

OTHER PUBLICATIONS

Akashi et al., "Synthesis and Polymerization of a Styryl Terminated Oligovinylpyrrolidone Macromonomer", *Die Angewandte Makromolekulare Chemie*, 132(1985), pp. 81–89.

"Graft Copolymers Having Hydrophobic Backbone and Hydrophilic Branches. V. Microspheres Obtained by the Copolymerization of Poly(ethylene Glycol) Macromonomers with Methyl Methacrylate", *Journal of Applied Polymer Science*, vol. 39, 2027–2030 (1990).

"Graft Copolymers Having Hydrophobic Backbone and Hydrophilic Branches. IV. A Copolymerization Study of Water–Soluble Oligovinylpyrrolidone Macromonomers", *Journal of Polymer Science*, Part A: Polymer Chemistry, vol. 27, 3521–3530 (1989).

Surfactant Systems Their Chemistry, Pharmacy and Biology, D. Attwood et al., pp. 508–519.

Journal of Applied Polymer Science, vol. 39, No. 9, 1990, New York, pp. 2027–2030 May, 1990.

*Primary Examiner*—James J. Seidleck
*Assistant Examiner*—R. F. Johnson
*Attorney, Agent, or Firm*—Gary L. Griswold; Walter N. Kirn; Janice L. Dowdall

[57] ABSTRACT

The invention provides inherently tacky, polymeric, organic, solvent-insoluble, solvent dispersible, elastomeric, pressure sensitive adhesive microspheres having pendant hydrophilic polymeric or oligomeric moieties having a degree of polymerization greater than or equal to 2. The microspheres which are sterically stabilized can offer enhanced stability against coagulation caused by alkali, alkali salts, polyelectrolytes and repeated freeze/thaw cycles. The present invention also provides pressure-sensitive adhesives comprising these microspheres including aerosol spray PSAs, coated sheet materials prepared therefrom, and method of making the microspheres.

41 Claims, No Drawings

1

TACKY MICROSPHERES HAVING PENDANT HYDROPHILIC POLYMERIC OR OLIGOMERIC MOIETIES

This is a continuation of application Ser. No. 07/989,101 filed Dec. 11, 1992, now abandoned.

FIELD OF THE INVENTION

This invention relates to inherently tacky, polymeric, organic, solvent-insoluble, solvent dispersible, elastomeric, pressure-sensitive adhesive microspheres having pendant hydrophilic polymeric or oligomeric moieties, to processes for their preparation, and to their use as pressure-sensitive adhesives.

BACKGROUND OF THE INVENTION

Inherently tacky, elastomeric microspheres having a solid or hollow morphology are known in the art to be useful in repositionable pressure-sensitive adhesive applications. As used herein, the term "repositionable" refers to the ability to be repeatedly adhered to and removed from a substrate without substantial loss of adhesion capability. Microsphere-based adhesives are thought to perform well in such applications at least in part due to their "self-cleaning" character, wherein substrate contaminants tend to be pushed aside and trapped between the microspheres as the adhesive is applied. Upon removal, the adhesive can then still present a relatively uncontaminated surface for reapplication to the substrate.

Most water based pressure-sensitive adhesive microspheres are stabilized electrostatically. Thus, most known microspheres can undergo coagulation caused by alkali, alkali salts, polyelectrolytes, and repeated cycles of freezing and thawing. Numerous references concern the preparation and/or use of inherently tacky, elastomeric acrylate polymeric microspheres. Silver (U.S. Pat. No. 3,691,140) discloses such microspheres that are prepared by aqueous suspension polymerization of alkyl acrylate monomers and ionic comonomers, e.g., sodium methacrylate, in the presence of an emulsifier, preferably an anionic emulsifier. The use of a water soluble, substantially oil-insoluble ionic comonomer is critical to preventing coagulation or agglomeration of the microspheres.

Baker et al. (U.S. Pat. No. 4,166,152) discloses solid, inherently tacky (meth)acrylate microspheres, which are prepared from non-ionic alkyl (meth)acrylate monomer(s) in the presence of both an emulsifier and an ionic suspension stabilizer having an interfacial tension sufficient to prevent microsphere agglomeration.

Kinoshita (U.S. Pat. Nos. 4,645,783 and 4,656,218) disclose a "repeatedly usable and releasable sheet" coated with an aqueous suspension of microspheres obtained by aqueous suspension polymerization of one or more alkyl(meth)acrylate esters, one or more alpha-monoolefin carboxylic acids, and one or more other vinyl monomers. The microspheres are prepared in the presence of a protective colloid that comprises casein as the main ingredient.

Delgado (U.S. Pat. No. 5,045,569) discloses the composition and suspension polymerization methods of preparation of hollow acrylate microspheres for use as repositionable adhesives. These hollow microspheres display lowered adhesive transfer and greater shear strength than similarly formulated pressure sensitive adhesives based on solid acrylate microspheres.

In general, however, most pressure sensitive adhesives are not microsphere based, but are instead continuous elastomeric coatings or films which possess an appropriate balance of viscoelastic properties.

Bohme et al. (U.S. Pat. No. 3,890,282) disclose a non-microsphere based pressure-sensitive adhesive that is prepared by the solution polymerization of (meth)acrylic acid, a functional polyalkylene oxide, and a combination of a water insoluble n-alkyl (meth)acrylate and a vinyl ester. The functional polyalkylene oxide is a condensation product of meth(acrylic) acid and a polyethylene oxide. Following the polymerization, at least 4 percent of the acid is neutralized. The patent teaches that these adhesives, due to the degree of neutralization of the acid, manifest greatly improved stability toward humidity and moisture.

Ray-Chaudhufi et al. (U.S. Pat. No. 3,891,584) describe a thermally and oxidatively stable non-microsphere hot melt adhesive consisting of a graft copolymer of a vinyl monomer and a non-functional water soluble polyalkylene oxide polymer that has a preferred average molecular weight of 6000. Approximately 15 to 25% by weight of a tackifying resin is included in the adhesive. The reference indicates that a minimum average molecular weight of the polyalkylene oxide polymer to achieve water dispersibility is 3000 with a preferred molecular weight of 6000.

Sunakawa et al. (U.S. Pat. No. 4,442,258) disclose a non-microsphere, film-forming water soluble pressure sensitive adhesive that is prepared by solution polymerization of a (meth)acrylate in the presence of a non-functional polyether polyol or polyhydric alcohol with a molecular weight less than 3000. The reference indicates that an addition polymer of the alkyl (meth)acrylate and/or the alkyl (meth)acrylate with the polyether polyol or polyhydric alcohol forms through a chain transfer mechanism. The reference also indicates that the presence of this addition polymer enhances the compatibility of water soluble plasticizers added to the polymer, which ultimately prevents plasticizer migration and oozing.

Thus, a need exists for pressure sensitive adhesive microspheres which are sterically stabilized such that the micro spheres can offer enhanced stability against coagulation caused by alkali, alkali salts, polyelectrolytes and repeated cycles of freezing and thawing.

SUMMARY OF THE INVENTION

We have found an inherently tacky, polymeric, organic, solvent-insoluble, elastomeric, pressure sensitive adhesive microsphere which is sterically stabilized and which can offer enhanced stability against coagulation caused by alkali, alkali salts, polyelectrolytes and repeated freeze/thaw cycles.

The present invention relates to inherently tacky, polymeric, organic, solvent-insoluble, solvent dispersible, elastomeric, pressure sensitive adhesive microspheres having pendant hydrophilic polymeric or oligomeric moieties having a degree of polymerization greater than or equal to 2.

The present invention also provides pressure-sensitive adhesives comprising, preferably consisting essentially of, these microspheres. More specifically, these inherently tacky, polymeric, organic, solvent-insoluble, solvent dispersible, elastomeric, pressure sensitive adhesive microspheres comprise:

100 parts by weight of the polymerization product of:

(a) at least about 30 parts by weight of at least one free radically polymerizable monomer selected from the group consisting of vinyl esters, alkyl acrylate esters, alkyl methacrylate esters, and mixtures thereof wherein a polymer prepared from the monomers would have a Tg of less than about −10° C.;

(b) about 0 to about 30 parts by weight of at least one polar monomer copolymerizable with the monomer of element (a); and (c) about 0.5 to about 40 parts by weight of at least one hydrophilic component selected from the group consisting of free radically reactive hydrophilic oligomers and polymers having a degree of polymerization greater than or equal to 2, functionalized derivatives thereof, and mixtures thereof.

The invention also provides for microspheres of this invention which are hollow, microspheres of this invention which are solid, methods of making these microspheres, aqueous suspensions of these microspheres, spray repositionable pressure-sensitive adhesive compositions containing these microspheres, and microsphere coated sheet materials.

Aqueous suspensions of hollow microspheres may be prepared by a two-step emulsification process comprising the steps of:

(a) forming a water-in-oil emulsion by combining (i) an Aqueous Phase I comprising water and at least one hydrophilic component selected from the group consisting of free radically reactive hydrophilic oligomers and polymers having a degree of polymerization greater than or equal to 2, functionalized derivatives thereof, and mixtures thereof and, optionally, at least one polar monomer with (ii) an Oil Phase II comprising at least one free radically polymerizable monomer selected from the group consisting of alkyl acrylate esters, alkyl methacrylate esters, vinyl esters, and mixtures thereof, wherein a polymer prepared from the monomers would have a Tg of less than about −10° C., and wherein the polar monomer is copolymerizable with the free radically polymerizable monomer;

(b) forming a water-in-oil-in-water emulsion by dispersing the water-in-oil emulsion into an Aqueous Phase II comprising water and an emulsifier having a hydrophilic-lipophilic balance value of at least about 6; and (c) initiating polymerization;

wherein all or part of the hydrophilic component and, if used, of the polar monomer(s) is alternatively added to the water-in-oil-in-water emulsion after polymerization of the water-in-oil-in-water emulsion is initiated, but before 100% conversion to polymer of the monomers of said water-in-oil-in-water emulsion occurs.

Aqueous suspensions of hollow microspheres may be prepared by a similar two-step emulsification process comprising the steps of:

(a) forming a water-in-oil emulsion by combining (i) an Aqueous Phase I comprising water and, optionally, at least one polar monomer, and (ii) an Oil Phase II comprising a free radically polymerizable monomer selected from the group consisting of vinyl esters, alkyl acrylate esters, alkyl methacrylate esters, and mixtures thereof, and at least one hydrophilic component selected from the group consisting of free radically reactive hydrophilic oligomers and polymers having a degree of polymerization greater than or equal to 2, functionalized derivatives thereof, and mixtures thereof;

(b) forming a water-in-oil-in-water emulsion by dispersing the water-in-oil emulsion into an Aqueous Phase II comprising water and an emulsifier having a hydrophilic-lipophilic balance value of at least about 6; and (c) initiating polymerization;

wherein all or part of the hydrophilic component and, if used, of the polar monomer(s) is alternatively added to the water-in-oil-in-water emulsion after polymerization of the water-in-oil-in-water emulsion is initiated, but before 100% conversion to polymer of the monomers of said water-in-oil emulsion occurs.

Aqueous suspensions of hollow microspheres which contain polar monomer(s) may also be prepared by a simpler ("one-step") emulsification process comprising the steps of:

(a) forming droplets by mixing in any order together (i) at least one free radically polymerizable monomer selected from the group consisting of vinyl esters, alkyl acrylate esters, alkyl methacrylate esters, and mixtures thereof, wherein a polymer prepared from the monomer(s) would have a Tg of less than about −10° C.;

(ii) optionally, at least one polar monomer copolymerizable with the free radically polymerizable monomer;

(iii) at least one hydrophilic component selected from the group consisting of free radically reactive hydrophilic oligomers and polymers having a degree of polymerization greater than or equal to 2, functionalized derivatives thereof, and mixtures thereof, (iv) at least one emulsifier which is capable of forming a water-in-oil emulsion inside the droplets, the emulsion being substantially stable during emulsification and polymerization, and (v) an aqueous medium; and, (b) initiating polymerization.

Aqueous suspensions of hollow microspheres may also be prepared by a modification of the "one-step" emulsification process comprising the steps of:

(a) forming droplets by mixing together (i) at least one free radically polymerizable monomer selected from the group consisting of vinyl esters, alkyl acrylate esters, alkyl methacrylate esters, and mixtures thereof, wherein a polymer prepared from the monomer(s) would have a Tg of less than about −10° C., (ii) optionally a portion of at least one hydrophilic component selected from the group consisting of free radically reactive hydrophilic oligomers and polymers having a degree of polymerization greater than or equal to 2, functionalized derivatives thereof, and mixtures thereof, and optionally a portion, if used, of at least one polar monomer copolymerizable with the free radically polymerizable monomer, (iii) at least one emulsifier which is capable of forming a water-in-oil emulsion inside the droplets, the emulsion being substantially stable during emulsification and polymerization, and (iv) an aqueous medium;

(b) initiating polymerization; and, (c) adding all or the remaining portion of polar monomer(s), if used, and all or the remaining portion of the hydrophilic component prior to the 100% conversion of the monomer contained in the droplets.

Aqueous suspensions of solid microspheres which contain polar monomer(s) may be prepared by an analogous "one-step" emulsification process comprising the steps of:

(a) forming droplets by mixing together:

(i) at least one free radically polymerizable monomer selected from the group consisting of vinyl esters, alkyl acrylate esters, alkyl methacrylate esters, and mixtures thereof, wherein a polymer prepared from the monomer would have a Tg of less than about −10° C., (ii) at least one polar monomer copolymerizable with the free radically polymerizable monomer:

(iii) at least one hydrophilic component selected from the group consisting of free radically reactive hydrophilic polymers and oligomers having a degree of polymerization greater than or equal to 2, functionalized derivatives thereof, and mixtures thereof:

(iv) at least one suspension stabilizer;

(v) an aqueous medium; and, (b) initiating polymerization; and (c) adding all or the remaining portion of polar monomer(s) and all or the remaining portion of the hydrophilic component prior to the 100% conversion of the monomer contained in the droplets.

The following terms have these meanings as used herein:
1. The term "droplet" means the liquid stage of the microspheres prior to the completion of polymerization.
2. The term "cavity" means a space within the walls of a droplet or microsphere when still in the suspension or dispersion medium prior to drying, and thus containing whatever medium was used.
3. The term "void" means an empty space completely within the walls of a polymerized microsphere.
4. The term "hollow" means containing at least one void or cavity.
5. The term "oligomer" means a polymer molecule comprising a degree of polymerization of from about 2 to about 20 repeating units.
6. The term "polymer" means a macromolecule with a degree of polymerization of about 21 or more repeating units.

All percents, parts, ratios, etc. described herein are by weight unless indicated otherwise.

DETAILED DESCRIPTION OF THE INVENTION

Free Radically Polymerizable Monomers

Alkyl acrylate and methacrylate monomers useful in preparing the microspheres and pressure-sensitive adhesives of this invention are those monofunctional unsaturated acrylate and methacrylate esters of non-tertiary alkyl alcohols, the alkyl groups of which preferably have from about 4 to about 14 carbon atoms. Such acrylate monomers are oleophilic, water emulsifiable, have restricted water solubility, and as homopolymers, generally have glass transition temperatures below about −10° C. Examples of such monomers include but are not limited to those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

Preferred acrylate monomers include those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Acrylate or methacrylate or other vinyl monomers which, as homopolymers, have glass transition temperatures higher than about −10° C., e.g., tert-butyl acrylate, isobornyl acrylate, butyl methacrylate, vinyl acetate, acrylonitrile, mixtures thereof, and the like, may optionally be utilized in conjunction with one or more of the acrylate, methacrylate and vinyl ester monomers provided that the glass transition temperature of the resultant polymer is below about −10° C.

Vinyl ester monomers suitable for use in this invention include but are not limited to those selected from the group consisting of vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 14 carbon atoms which as homopolymers have glass transition temperatures below about −10° C. Preferred vinyl ester monomers include those selected from the group consisting of vinyl laurate, vinyl caprate, vinyl-2-ethylhexanoate, and mixtures thereof.

Polar Monomers

The polar monomers useful in the present invention are both somewhat oil-soluble and water-soluble, resulting in a distribution of the polar monomer between the aqueous and the oil phases.

Representative examples of suitable polar monomers include but are not limited to those selected from the group consisting of acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxyethyl) ammonium propionate betaine, trimethylamine methacrylimide, 1,1-dimethyl-1-(2,3-dihydroxypropyl)amine methacrylimide, N-vinyl pyrrolidone, N-vinyl caprolactam, acrylamide, t-butyl acrylamide, dimethyl amino ethyl acrylamide, N-octyl acrylamide, mixtures thereof, and the like. Preferred polar monomers include those selected from the group consisting of monoolefinic monocarboxylic acids, monoolefinic dicarboxylic acids, acrylamides, N-substituted acrylamides, salts thereof, and mixtures thereof. Examples of such monomers include but are not limited to those selected from the group consisting of acrylic acid, sodium acrylate, N-vinyl pyrrolidone, and mixtures thereof.

Hydrophilic Component

Free radically reactive hydrophilic oligomers and/or polymers useful according to the present invention include but are not limited to those selected from the group consisting of poly(alkylene oxides) such as poly(ethylene oxide), poly(vinyl methyl ether), poly(acrylamide), poly(n-vinylpyrrolidone), poly(vinyl alcohol), and mixtures thereof.

Functionalized derivatives of free radically reactive hydrophilic oligomers and polymers useful according to this invention include those selected from the group consisting of macromonomers of the general formula:

$$X—(Y)_n—Z \qquad \text{I}$$

wherein

X is a group that is free radically copolymerizable with the free radically polymerizable monomer and an optional polar monomer(s);

Y is a divalent linking group;

n is an integer of 0 to 1;

Z is a monovalent hydrophilic polymeric or oligomeric moiety having a degree of polymerization greater than or equal to 2.

Examples of such macromonomers include but are not limited to those selected from the group consisting of acrylate and methacrylate functional oligomers and polymers, where X represents $H_2C{=}CR_1—$, $R_1$ represents H or $CH_3$, Y is a divalent carboxyl group, n=1, and Z is a hydrophilic oligomeric or polymeric moiety having a degree of polymerization greater than or equal to 2. Such macromonomers also include but are not limited to p-styryl functional materials, where X represents $H_2C{=}CR_1—$, $R_1$ represents —H or —$CH_3$, Y represents

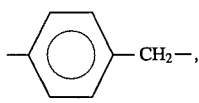

n=1, and Z is a hydrophilic oligomeric or polymeric moiety with a degree of polymerization greater than or equal to 2. Difunctional or multifunctional oligomers and polymers having more than one X group radically copolymerizable with the free radically copolymerizable monomers and polar monomers of the invention, such X groups either pendant from or terminating hydrophilic polymeric or oligomeric moiety Z, are also useful in the microspheres of the present invention. Although we do not wish to be bound by any theory or mechanism we believe that hydrophilic components having polymeric or oligomeric moieties greater than or equal to 2 are required to provide an effective steric layer around the microsphere. As a result of this layer, the pressure-sensitive microspheres of this invention can be sterically stabilized.

Preferred macromonomers include those selected from the group consisting of acrylate terminated poly(ethylene oxide), methacrylate terminated poly(ethylene oxide), methoxy poly(ethylene oxide) methacrylate, butoxy poly(ethylene oxide) methacrylate, p-vinyl benzyl terminated poly(ethylene oxide), acrylate terminated poly(ethylene glycol), methacrylate terminated poly(ethylene glycol), methoxy poly(ethylene glycol) methacrylate, butoxy poly(ethylene glycol) methacrylate, p-vinyl benzyl terminated poly(ethylene glycol), poly(ethylene oxide) diacrylate, poly(ethylene oxide) dimethacrylate, and mixtures thereof. These functionalized materials are preferred because they are easily prepared through well-known ionic polymerization techniques and are also highly effective in providing grafted hydrophilic segments along free radically polymerized acrylate polymer backbones.

Preferred macromonomers also include those selected from the group consisting of p-vinyl benzyl terminated poly(n-vinyl pyrrolidone), p-vinyl benzyl terminated poly(acrylamide), methacrylate terminated poly(n-vinyl pyrrolidone), p-vinyl benzyl terminated poly(acrylamide), and mixtures thereof. These macromonomers may be prepared through the esterification reaction of a carboxy terminated n-vinyl pyrrolidone or acrylamide, beta-mercaptopropionic acid chain transfer agent, and chloromethyl styrene or methacryloyl chloride as described in a series of papers by M. Akashi et al. [*Angew. Makromol. Chem.*, 132, 81 (1985); *J. Appl. Polym. Sci.*, 39, 2027 (1990); *J. Polym. Sci.*, Part A: *Polym. Chem.*, 27, 3521 (1989)], all incorporated by reference herein.

Component Ranges

The microspheres of this invention and the pressure-sensitive adhesives made therefrom comprise, based upon 100 parts by weight total, at least about 30 parts by weight of at least one free radically polymerizable monomer selected from the group consisting of alkyl acrylate esters, alkyl methacrylate esters, vinyl esters, and mixtures thereof, optionally up to about 30 parts by weight of one or more polar monomers, and about 0.5 to about 40 parts by weight of at least one hydrophilic component.

Preferably, the pressure-sensitive adhesive microspheres comprise about 80 to about 95 parts of free radically polymerizable monomer selected from the group consisting of alkyl acrylate esters, alkyl methacrylate esters, vinyl esters, and mixtures thereof, optionally about 2 to about 17 parts of at least one polar monomer, and about 3 to about 18 parts of a hydrophilic component, based upon 100 parts by weight total. Most preferably the pressure-sensitive adhesive microspheres comprise about 87 to about 95 parts of free radically polymerizable monomer, about 2 to about 5 parts of a hydrophilic component, and, optionally, about 3 to about 8 parts of a polar monomer, based upon 100 parts by weight total.

Preferably, at least one polar monomer is included in the composition, but microspheres may also be prepared using alkyl acrylate, alkyl methacrylate and/or vinyl ester monomer(s) alone or in combination only with other vinyl free radically polymerizable monomers, e.g., vinyl acetate. However, when a methacrylate monomer alone is utilized, a crosslinking agent, infra, must be included unless the hydrophilic component comprises more than one radically copolymerizable group X as defined in Formula I. Most preferably at least about 1 part to about 10 parts by weight polar monomer is included as this ratio provides microspheres with balanced pressure-sensitive adhesive properties.

Two-Step Method of Preparing Hollow Microspheres

Aqueous suspensions of the hollow microspheres of the invention may be prepared by a "two-step" emulsification process which first involves forming a water-in-oil emulsion of an aqueous solution of at least one free radically polymerizable hydrophilic component and, if used, polar monomer(s), in the oil phase monomer (i.e., at least one alkyl acrylate, alkyl methacrylate, and/or vinyl ester), using an emulsifier having a low hydrophilic-lipophilic balance (HLB) value. Where it is desirable not to include a polar monomer, an aqueous solution of at least one free radically polymerizable hydrophilic component may be mixed directly with the oil phase monomer (i.e., alkyl acrylate, alkyl methacrylate, and/or vinyl ester), and emulsifier to form the water-in-oil emulsion. Alternatively, analogous "two-step" processes may be followed in which at least one free radically polymerizable hydrophilic component is combined with the oil phase monomer(s), rather than the aqueous phase components, in the water-in-oil emulsion.

Suitable emulsifiers for the preparation of hollow microspheres having pendant hydrophilic polymeric and/or oligomeric moieties are those having HLB values below about 7, preferably in the range of about 2 to about 7. Examples of such emulsifiers include but are not limited to those selected from the group consisting of sorbitan monooleate, sorbitan trioleate, and ethoxylated oleyl alcohol (such as Brij™ 93, available from Atlas Chemical Industries, Inc.), and mixtures thereof. It is noted that if a two-step method is followed in which the water-in-oil-in-water emulsion is unstable, solid microspheres could result.

In the first step for preparing hollow microspheres, oil phase monomer(s), emulsifier, a free radical initiator, and optional crosslinking monomer or monomers as defined below are combined, and an aqueous solution comprising water and, if used, polar monomer(s) is agitated and poured into the oil phase mixture to form a water-in-oil emulsion. The free radically reactive hydrophilic component(s), as specified above, may be added to either the oil phase or aqueous phase components of the water-in-oil emulsion. A thickening agent, such as methyl cellulose, may also be included in the aqueous phase of the water-in-oil emulsion. In the second step, a water-in-oil-in-water emulsion is formed by dispersing the water-in-oil emulsion of the first step into an aqueous phase containing an emulsifier having an HLB value above about 6. Examples of such emulsifiers include but are not limited to those selected from the group consisting of ethoxylated sorbitan monooleate, ethoxylated lauryl alcohol, alkyl sulfates, and mixtures thereof. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^4$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, N.Y., 1983), incorporated by reference herein. The final process step of the method of the invention involves the application of heat or radiation to initiate polymerization of the monomers.

One-Step Method of Preparing Hollow Microspheres

Aqueous suspensions of hollow microspheres which contain polar monomer(s) may also be prepared by a "one-step" emulsification process comprising the aqueous suspension polymerization of at least one alkyl acrylate, alkyl methacrylate, and/or vinyl ester monomer, at least one free radically reactive hydrophilic component, and, optionally, at least one polar monomer in the presence of at least one emulsifier capable of producing a water-in-oil emulsion inside the droplets which is substantially stable during emulsification and polymerization. As in the two-step emulsification process, the emulsifier is utilized in concentrations greater than its critical micelle concentration. In general, emulsifiers formulated at this concentration will produce stable cavity-containing droplets during the polymerization, and are suitable for use in this one-step process. Examples of such emulsifiers include but are not limited to those selected from the group consisting of alkylarylether sulfates such as sodium alkylarylether sulfate, e.g., Triton™ W/30, available from Rohm and Haas; alkylarylpolyether sulfates such as alkylarylpoly(ethylene oxide) sulfates; alkyl sulfates such as sodium lauryl sulfate, ammonium lauryl sulfate, triethanolamine lauryl sulfate, and sodium hexadecyl sulfate; alkyl ether sulfates such as ammonium lauryl ether sulfate, and alkylpolyether sulfates such as alkyl poly(ethylene oxide) sulfates; alkylarylpolyether sulfonates such as alkylarylpoly(ethylene oxide) sodium sulfonate (e.g., Triton™ X-200, commercially available form the Rohm and Haas Co.); alkyl benzene sulfonates such as sodium p-dodecylbenzene sulfonate (e.g., Siponate DS™-10, commercially available from Alcolac, Inc.); alkyl sulfosuccinates, such as Aerosol™ OT, a dioctyl ester of sodium sulfosuccinic acid commercially available from American Cyanamid Process Chemicals Dept.; and mixtures thereof. Emulsifiers selected from the group consisting of alkyl sulfates, alkyl ether sulfates, alkylarylether sulfates, and mixtures thereof are preferred as they provide a maximum void volume per microsphere for a minimum amount of surfactant. Nonionic emulsifiers, e.g. Siponic™ Y-500-70 (ethoxylated oleyl alcohol, commercially available from Alcolac, Inc.)and Pluronic™ P103 (block copolymer of polypropylene oxide and polyethylene oxide commercially available form BASF Corporation), can also be utilized alone or in conjunction with anionic emulsifiers, and mixtures thereof. Polymeric stabilizers may also be present but are not necessary.

One-Step Method of Preparing Solid Microspheres

Aqueous suspensions of solid microspheres may be prepared by a "one-step" emulsification process comprising an aqueous suspension polymerization of at least one alkyl acrylate, alkyl methacrylate, and/or vinyl ester monomer, at least one free radically reactive hydrophilic component, at least one suspension stabilizer, such as poly(vinyl alcohol), and, optionally, at least one polar monomer. It is believed that other polymeric stabilizers, such as those described in U.S. Pat. No. 4,166,152 (Baker et al.), incorporated herein by reference, and other steric or electrosteric polymeric stabilizers, including but not limited to those selected from the group consisting of polyoxyethylene, polyacrylic acid, polymethacrylic acid, polyacrylamide, polyvinyl pyrrolidone, polyethylene imine, polyvinyl methyl ether, salts thereof, and mixtures thereof, would also be useful according to the present invention.

All of these preparative methods may be modified by withholding the addition of all or part of at least one free radically reactive hydrophilic component and, if used, of the polar monomer(s) until after polymerization of the oil emulsion is initiated. This may be done provided that the withheld components are added to the polymerizing mixture prior to the 100% conversion to polymer of the monomers of the water-in-oil emulsion. This processing flexibility allows the formulator to add any portion of the free radically reactive hydrophilic polymer(s) or oligomer(s) and optional polar monomer(s) at any convenient point in preparing the pressure-sensitive adhesive microspheres of this invention.

Suitable initiators are those which are normally suitable for free radical polymerization of free radically polymerizable monomers and which are oil-soluble and of very low solubility in water. Examples of such initiators include but are not limited to those selected from the group consisting of thermally-activated initiators such as azo compounds, hydroperoxides, peroxides, and the like, and photoinitiators such as benzophenone, benzoin ethyl ether, and 2,2-dimethoxy-2-phenyl acetophenone, and the like, and mixtures thereof. Use of a water-soluble polymerization initiator causes formation of substantial amounts of latex. The initiator is generally used in an amount ranging from about 0.01 percent up to about 10 percent by weight of the total polymerizable composition (i.e., monomers, hydrophilic component, and initiator), preferably up to about 5 percent.

Crosslinking Agents

The composition from which the microspheres of the invention are made may also contain a multifunctional crosslinking agent. The term "multifunctional" as used herein refers to crosslinking agents which possess two or more free radically polymerizable ethylenically unsaturated groups. Useful multifunctional crosslinking agents include those selected from the group consisting of acrylic or methacrylic esters of diols such as butanediol diacrylate, triols such as glycerol, and tetrols such as pentaerythritol. Other useful crosslinking agents include those selected from the group consisting of polymeric multifunctional (meth-)acrylates, e.g., poly(ethylene oxide)diacrylate or poly(ethylene) oxide dimethacrylate; polyvinylic crosslinking agents, such as substituted and unsubstituted divinylbenzene; and difunctional urethane acrylates, such as Ebecryl™ 270 and Ebecryl™ 230 (1500 weight average molecular weight and 5000 weight average molecular weight acrylated urethanes, respectively—both available from Radcure Specialties)., and mixtures thereof. When used, crosslinker(s) is (are) added at a level of up to about 0.15 equivalent weight %, preferably up to about 0.1 equivalent weight %, of the total polymerizable composition. The "equivalent weight %" of a given compound is defined as the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight=molecular weight). The crosslinker can be added to any phase at any time before 100% conversion to polymer of the monomers of this microsphere composition. Preferably it is added before initiation occurs.

Microsphere Diameter

The microspheres of the invention are normally tacky, elastomeric, solvent-insoluble but swellable in organic solvents, and small, typically having diameters of at least about 1 micrometer, preferably in the range of about 1 to about 300 micrometers. When the microspheres are hollow, the voids typically range in size up to about 100 micrometers or larger.

While not wishing to be bound by theory, it is believed that the pendant hydrophilic moieties are located near to or at the surface of the microspheres of the invention. In the aqueous suspension of the microspheres, the hydrophilic polymeric and/or oligomeric moieties extend from the surface of the microspheres toward the continuous phase, thus acting as a steric stabilizer for the microsphere. This steric stabilization, as explained by D. H. Napper in a section entitled "Steric Stabilization" from Polymeric Stabilization of Colloidal Dispersions, London: Academic Press, (1983), incorporated by reference herein, can prevent flocculation of the microspheres, which can lead to coagulum formation. The presence of the pendant hydrophilic moieties also enhances the stability of these microspheres in alkali, alkali salt and polyelectrolytic media.

Following polymerization by any of these one-step or two-step processes, an aqueous suspension of the hollow or solid microspheres is obtained which is stable to agglomeration or coagulation under room temperature conditions (i.e., about 20° to about 25° C.). The suspension may have a non-volatile solids contents of from about 10 to about 50 percent by weight. Upon prolonged standing, the suspension can separate into two phases, one phase being aqueous and substantially free of polymer, the other phase being an aqueous suspension of microspheres. Both phases may contain a minor portion of submicron latex particles. Decantation of the microsphere-rich phase provides an aqueous suspension having a non-volatile solids content on the order of about 40 to about 50 percent which, if shaken with water, will readily redisperse. If desired, the aqueous suspension of microspheres may be utilized immediately following polymerization to provide inherently tacky pressure-sensitive adhesive coatings. The suspension may be coated on suitable flexible or inflexible backing materials by conventional coating techniques such as knife coating or Meyer bar coating or use of an extrusion die.

Once dried, the microspheres, with sufficient agitation, will readily disperse in common organic liquids such as ethyl acetate, tetrahydrofuran, heptane, 2-butanone, benzene, cyclohexane, and esters. Solvent dispersions of the microspheres may also be coated on at least one side of a suitable backing material by conventional coating techniques, as described above for aqueous suspensions.

Suitable backing materials for the aqueous or solvent based coatings include but are not limited to those selected from the group consisting of paper, plastic films, cellulose acetate, ethyl cellulose, woven or nonwoven fabric formed of synthetic or natural materials, metal, metallized polymeric film, ceramic sheet material, and the like.

Some microspheres will also disperse in water depending on their composition. When coated on a water-dispersible backing including but not limited to those selected from the group consisting of paper and polymeric materials dispersible in water which are optionally coated with a water dispersible coating, these water dispersible microspheres can be used to form a water dispersible adhesive construction. Primers or binders may be used, but they are not required.

Suspensions or dispersions of the microspheres in a liquid medium, e.g., water or an organic liquid as described above, may be sprayed by conventional techniques without cobwebbing or may be incorporated in aerosol containers with suitable propellants including but not limited to those selected from the groups consisting of alkanes, alkenes, chlorofluorocarbons, e.g., Freon™ halocarbon propellents (commercially available from E.I. du Pont de Nemours & Co., Inc.), and mixtures thereof. Useful aerosol formulae have a solids content of from about 5% to about 20%, preferably from about 10% to about 16%.

The pressure-sensitive adhesive properties of the microspheres may be altered by the addition of tackifying resin and/or plasticizer. It is also within the scope of this invention to include various other components, such as pigments, neutralizing agents such as sodium hydroxide, etc., fillers, stabilizers, or various polymeric additives. Preferably, the pressure-sensitive adhesive of the invention consists essentially of the microspheres of the invention.

The present invention provides a roll of tape which includes a flexible backing member, the pressure-sensitive adhesive of the invention coating one major surface of the backing member, and a release coating on the opposite major surface of the backing, wound convolutely on itself about a core to form a roll. The invention further provides a tape comprising a flexible backing member, the pressure-sensitive adhesive coating one major surface of the backing member and a release liner comprising a flexible sheet coated over the major surface adhered to the pressure-sensitive coating. The invention further provides a transfer tape comprising a film of pressure-sensitive adhesive between two release liners.

The invention further provides for a double coated tape or double coated sheet which comprises a flexible backing member and the pressure-sensitive adhesive of the present invention coating both major surfaces of the backing member.

The invention further provides a coated sheet material having a release agent on one side and the adhesive on the other side wherein said coated sheet material can be wound convolutely on itself about a core to form a roll.

Examples of useful release coatings include but are not limited to those selected from the group consisting of silicones, fluorosilicones, and low adhesion backsize coatings such as those described in, for example, U.S. Pat. Nos. 2,532,011; 2,607,711; and 3,318,852, all of which are incorporated herein by reference.

These and other examples of the invention are illustrated by the following examples which should not be viewed as limiting in scope. Microspheres consisting of at least one alkyl acrylate, alkyl methacrylate or vinyl ester, at least one free radically reactive hydrophilic polymer or oligomer having a degree of polymerization greater than or equal to 2, and, optionally, at least one polar monomer were prepared and examined for tack, diameter, morphology and stability against coagulation and water dispersibility.

Test Methods

Tack

The tack of sheets coated with the microspheres of the invention was measured with a Polyken Probe Tack tester (available from Kendall Company) according to American Society for Testing and Materials Test Method ASTM D2979-88. Microspheres of the current invention were coated onto 10 mil paper, yielding a dried adhesive coating thickness of 1 to 2 mils. After cleaning the probe with ethyl acetate using a lint-free cloth, a 2 cm×2 cm sample of the adhesive coated sheet was placed on the annular ring weight of the Polyken apparatus. The tack was then measured and recorded using a 10 mm stainless steel probe having a diameter of 0.4975 cm with a speed of 0.5 cm/second and dwell time of 1 second.

Abbreviations and Tradenames

The following abbreviations and tradenames are used herein.

| | |
|---|---|
| AA | acrylic acid |
| Acm MAC | p-vinyl benzyl functional polyacrylamide (Mw = 2000) |
| AmA | ammonium acrylate |
| BA | n-butyl acrylate |
| BDA | 1,4 butanediol diacrylate |
| BSA-211 | poly alkoxyethyl sulfate (available from PPG Industries) |
| D.I. Water | deionized water |
| DVB | divinyl benzene |
| EHA | 2-ethylhexyl acrylate |
| HDDA | 1,6 hexanediol diacrylate |
| HEMA | hydroxyethyl methacrylate |
| IA | itaconic acid |
| IOA | isooctyl acrylate |
| MA | maleic acid |
| MAA | methacrylic acid |
| NaAA | sodium acrylate |
| NFPEOMW | non-functional monohydroxy polyethyleneglycol of MW molecular weight |
| NP-PEO1700 | nonyl phenol (ethylene oxide)$_{38}$ methacrylate |
| NVP | n-vinyl pyrrolidone |
| PBW | parts by weight |
| PEO-750 | acrylate terminated poly (ethylene oxide) polymer having an average molecular weight of 750 |
| PEO-DMA | (polyethylene oxide)$_9$ dimethacrylate |
| PEO-MW | methoxy poly (ethylene oxide) methacrylate of MW molecular weight |
| Photo-mer™ | nonyl phenol (ethylene oxide)$_4$ acrylate, available commercially from Harcross Chemical Company |
| STY | styrene |
| Trem™ LF40 | sodium alkyl allyl sulfosuccinate available from Henkel Corporation |
| VAc | vinyl acetate |
| VL | vinyl laurate |

EXAMPLE 1

A 1-liter indented resin flask was charged with 450 ml of deionized water and 6 g of Standapol™ A (ammonium lauryl sulfate commercially available from Henkel Corporation). The aqueous solution was stirred at 400 rpm, heated to 60° C., and degassed with argon. Next, 150 g of a monomer mixture (i.e., 137,8 g IOA, 7.7 g AA, and 4.5 g PEO-750,) and 0.71 g Lucidol™-70 (70% benzoyl peroxide, commercially available from Atochem North America, Inc.) were added to the hot aqueous surfactant solution then degasseal with argon. The temperature was then reduced to 60° C. for 22 hours. Upon cooling, a suspension of hollow, tacky acrylate microspheres was obtained and coated, as described in the above test methods, to measure their tack. The tack of the microspheres is recorded below in Table 1.

The microspheres were also evaluated for water dispersibility. Approximately 51.6 cm² of the paper coated with microspheres was adhered to James River blotter paper. This was then cut into 1.27 cm squares and placed in a Waring blender. Additional 1.27 cm cut blotter paper was added, such that the total weight of the paper was 15 g. 500 ml of room temperature water was then added to the blender and the aqueous paper solution was blended for three 20 seconds cycles at 15,000 RPM with a 1 minute soaking interval between cycles. Three 20.3×20.3 cm handsheets were then prepared from the slurry, each of which consisted of approximately 100 ml of the slurry. The handsheets were examined in transmitted and reflected light for water dispersibility failures. A failure consists of dark or transparent patches of undispersed paper or adhesive. The handsheets were also examined for tacky patches of adhesive on the surface of the paper. Y=indicates that the water dispersibility test was passed. N=indicates that the test was not passed.

TABLE 1

| Ex. | Composition | PBW | Tack (g) | Microsphere Diameter (microns) | Pass Water Dispersibility Test |
|---|---|---|---|---|---|
| 1 | IOA/AA/PEO-750 | 90/5/3 | 250 | 38 | Y |

EXAMPLES 2–11

These examples illustrate the effect of altering the proportion of IOA, AA, and PEO-750 in the microspheres of this invention and were prepared according to the one-step emulsification method described in Example 1. These examples show that at a constant AA concentration, the tack generally increases with increasing PEO-750 content. The tack values for the hollow microspheres of Examples 2–11 are recorded in Table 2.

TABLE 2

| Ex. | Composition | PBW | Tack (g) |
|---|---|---|---|
| 2 | IOA/AA/PEO-750 | 90/5/1 | 193 |
| 3 | IOA/AA/PEO-750 | 90/5/5 | 187 |
| 4 | IOA/AA/PEO-750 | 85/5/10 | 320 |
| 5 | IOA/AA/PEO-750 | 85/10/5 | 242 |
| 6 | IOA/AA/PEO-750 | 80/10/10 | 195 |
| 7 | IOA/AA/PEO-750 | 75/20/5 | 72 |
| 8 | IOA/AA/PEO-750 | 75/5/20 | 300 |
| 9 | IOA/AA/PEO-750 | 70/20/10 | 179 |
| 10 | IOA/AA/PEO-750 | 70/10/20 | 446 |
| 11 | IOA/AA/PEO-750 | 60/20/20 | 188 |

EXAMPLES 12–16

These examples illustrate the use of various alkyl acrylate, alkyl methacrylate, and vinyl ester monomers (and combinations thereof with high Tg vinyl monomers) with AA and PEO-750 for the preparation of hollow tacky acrylate microspheres having pendant hydrophilic moieties. The method described in Example 1 was used to prepare these microspheres. The tack values and diameters of the microspheres of Examples 12-16 are recorded in Table 3.

TABLE 3

| Ex. | Composition | PBW | Tack (g) | Diameter |
|---|---|---|---|---|
| 12 | BA/AA/PEO-750 | 90/5/5 | 124 | 75 μm |
| 13 | EHA/AA/PEO-750 | 90/5/5 | 213 | 56 μm |
| 14 | IOA/VAc/AA/PEO-750 | 80/6.6/3.3/10 | 194 | 50 μm |
| 15 | IOA/STY/AA/PEO-750 | 80/5/5/10 | 148 | 56 μm |
| 16 | VEH/AA/PEO-750/DVB | 90/5/5/0.025 | 185 | 17 μm |

EXAMPLES 17–24

These examples illustrate the use of various polar monomers with IOA and PEO-750 for the preparation of tacky acrylate microspheres having pendant hydrophilic moieties. Examples 22–24 demonstrate that a polar monomer is not required to prepare these microspheres. The method described in Example 1 was used to prepare these hollow microspheres. The tack values and water dispersibilities for the microspheres of Examples 17–24 are recorded in Table 4.

TABLE 4

| Ex. | Composition | PBW | Tack (g) | Pass Water Dispersibility Test |
|---|---|---|---|---|
| 17 | IOA/IA/PEO-750 | 90/5/5 | 160 | Y |
| 18 | IOA/HEMA/PEO-750 | 90/5/5 | 187 | Y |
| 19 | IOA/MA/PEO-750 | 90/5/5 | 182 | Y |
| 20 | IOA/NVP/PEO-750 | 90/5/5 | 230 | Y |
| 21 | IOA/AmA/PEO-750 | 89/2/9 | 165 | Y |
| 22 | IOA/MAA/PEO-750 | 90/5/5 | 360 | Y |
| 23 | IOA/PEO-750 | 90/10 | 143 | Y |
| 24 | IOA/PEO-750 | 80/20 | 152 | Y |

EXAMPLES 25–33

These examples, prepared by the one-step method of Example 1, demonstrate the effect of the molecular weight of the free radically polymerizable hydrophilic component. Methoxy poly(ethylene oxide) methacrylate with three different molecular weights of PEO (90, 500 and 1070 average molecular weights, available from Polysciences, Inc.) were employed in these examples. The tack of these hollow microspheres, as reported in Table 5, was found to increase with increasing PEO molecular weight. The tack values and diameters of the microspheres of Examples 25–33 are recorded in Table 5.

TABLE 5

| Ex. | Composition | PBW | Tack (g) | Microsphere Diameter (microns) |
|---|---|---|---|---|
| 25 | IOA/AA/PEO-90 | 90/5/5 | 176 | 59 |
| 26 | IOA/AA/PEO-400 | 90/5/5 | 85 | 77 |
| 27 | IOA/AA/PEO-1000 | 90/5/5 | 192 | 50 |
| 28 | IOA/AA/PEO-90 | 85/5/10 | 116 | 35 |
| 29 | IOA/AA/PEO-400 | 85/5/10 | 131 | 40 |
| 30 | IOA/AA/PEO-1000 | 85/5/10 | 240 | 67 |
| 31 | IOA/AA/PEO-90 | 94/5/1 | 142 | 43 |
| 32 | IOA/AA/PEO-400 | 92/5/3 | 142 | 87 |
| 33 | IOA/AA/PEO-1000 | 89/5/6 | 190 | 72 |

EXAMPLES 34–39

The hollow microspheres of Examples 33–38 were prepared by the one-step polymerization process of Example 1 using different molecular weights of non-functional monohydroxy polyethylene glycol. The results demonstrate equivalent tack to those microspheres which contain free radically polymerizable polymeric or oligomeric components. The tack values for the microspheres of Examples 34–39 are recorded in Table 6.

Incorporation of the Hydrophilic Macromer

The amount of hydrophilic material that was incorporated into the microspheres was analyzed through Fourier Transform Infrared Spectroscopy (FTIR). Following the procedure according to Example 1, dispersions were prepared with monohydroxy poly(ethylene glycol) (NF-PEOMW, where MW is the molecular weight), commercially available from Polysciences, Inc. Following the reaction, the microspheres were washed ten times with isopropyl alcohol. The washing stage removes any non-grafted hydrophilic material. Following the washing stage, the microspheres were analyzed with FTIR to determine the amount of NF-PEOMW remaining in the microspheres, which corresponded to the amount of material that had grafted to the microspheres. Table 6 lists the compositions and percent of the original amount of hydrophilic material that had grafted to the microspheres, along with tack and water dispersibility test results.

TABLE 6

| Ex. | Composition | Parts by Wt. | Tack (g) | Hydrophilic Material Grafted to the Microspheres (%) | Pass Water Dispersibility Test |
|---|---|---|---|---|---|
| 34 | IOA/AA/NF-PEO350 | 90/5/5 | 177 | 22 | Y |
| 35 | IOA/AA/NF-PEO750 | 90/5/5 | 127 | 19 | Y |
| 36 | IOA/AA/NF-PEO2000 | 90/5/5 | 154 | 9 | Y |
| 37 | IOA/AA/NF-PEO5000 | 90/5/5 | 154 | 5 | Y |
| 38 | IOA/AA/NF-PEO100K | 90/5/5 | 238 | | Y |
| 39 | IOA/AA/NF-PEO600K | 90/5/5 | 239 | | Y |

EXAMPLES 40–45

These examples comprise microspheres prepared with different functional ionic (Examples 40 and 42) and non-ionic (Examples 41 and 43–45) surfactants and macromonomeric materials. As can be seen in Table 7, comparable tack values for these hollow microspheres are found using these surfactants as is evident in microspheres employing other forms of hydrophilic polymeric or oligomeric components.

TABLE 7

| Example | Composition | PBW | Tack (g) |
|---|---|---|---|
| 40 | IOA/AA/Trem LF-40 | 90/5/5 | 130 |
| 41 | IOA/AA/NP-PEO-1700 | 90/5/5 | 100 |

TABLE 7-continued

| Example | Composition | PBW | Tack (g) |
|---|---|---|---|
| 42 | IOA/AA/BSA-211 | 90/5/5 | 96 |
| 43 | IOA/AA/Photomer | 90/5/5 | 282 |
| 44 | IOA/Acm MAC | 98/2 | 183 |
| 45 | IOA/AA/NVP MAC | 95/4.5/0.5 | 237 |

EXAMPLES 46–49

Examples 46–49 describe hollow microspheres prepared in a similar manner to Example 1, but in the presence of different crosslinking agents. These examples demonstrate that hollow microspheres crosslinked at this level maintain appreciable tack.

TABLE 8

| Ex. | Composition | PBW | Tack (g) |
|---|---|---|---|
| 46 | IOA/AA/PEO-750/DVB | 85/5/10/0.67 | 161 |
| 47 | IOA/AA/PEO-750/PEO/DMA | 85/5/10/0.67 | 205 |
| 48 | IOA/AA/PEO-750/HDDA | 80/6.6/13/3/0.67 | 133 |
| 49 | IOA/NVP/PEO-750/BDA | 90/5/5/0.33 | 230 |

EXAMPLES 50–53

These examples were prepared according to the procedure of Example 1 except where indicated otherwise in a 1 liter reaction flask by a modified one-step process, where half of the acrylic acid (AA) and all of the PEO-750 was added to the reactor when the conversion of the polymerizing mixture had approached 80 to 90%. There was no change in the quantity of materials used; however, the reactions were conducted at 65° C. for 7.5 hours rather than 60° C. and 22 hours, respectively, for the one-step method of Example 1.

TABLE 9

| Ex. | Composition | PBW | Tack (g) |
|---|---|---|---|
| 50 | IOA/AA/PEO-750 | 96/2/0.5 | 131 |
| 51 | IOA/AA/PEO-750 | 96/2/1 | 116 |
| 52 | IOA/AA/PEO-750 | 96/2/2 | 162 |
| 53 | IOA/AA/PEO-750 | 96/5/5 | 250 |

EXAMPLE 54

This example demonstrates a two-step method for preparing the hollow microspheres of this invention through the addition of the hydrophilic component to the oil phase of the water-in-oil emulsion. 0.71 g of Lucidol™ 70, 3 g of Arlacel™ 80 (a sorbitan monooleate emulsifier of HLB=4.3, commercially available from ICI Americas, Inc.), and 3 g of PEO-750 were dissolved in 144 g of IOA. 3 g of AmA was dissolved in 450 g of D.I. water. 100 g of the AmA/water mixture was emulsified in the IOA mixture using an Omni™ mixer, available from Omni International Inc., to form a water-in-oil emulsion. 6 g of Standapol™ A was dissolved in the remaining 350 g of the IOA/water mixture, which was charged to a 1 liter baffled reactor. The water-in-oil emulsion was then charged to the same reactor and the mixture was stirred at 400 RPM, which formed a water-in-oil emulsion. The reactor was heated to 60° C., degassed with argon and allowed to react for 22 hours. The suspension was then allowed to cool to room temperature. The reactor was the emptied and the suspension filtered. The tack and diameter of these hollow microspheres are reported in Table 10.

TABLE 10

| Ex. | Composition | PBW | Tack (g) | Microsphere Diameter (microns) |
|---|---|---|---|---|
| 54 | IOA/AmA/PEO-750 | 96/2/2 | 93 | 27 |

EXAMPLE 55

This example demonstrates a two-step method for preparing the hollow microspheres of this invention through the addition of the hydrophilic component to the aqueous phase of the water-in-oil emulsion. 0.71 g of Lucidol™ 70 and 3 g of Arlacel™ 80 were dissolved in 144 g of IOA. 3 g of AmA was dissolved in 450 g of D.I. water. 100 g of the AmA/water mixture was emulsified in the IOA mixture using an Omni™-Mixer to form a water-in-oil emulsion. 6 g of Standapol™ A and 3 g of PEO-750 was dissolved in the remaining 350 g of the IOA/water mixture, which was charged to a 1 liter baffled reactor. The water-in-oil emulsion was then charged to the same reactor and the mixture was stirred at 400 RPM, which formed a water-in-oil emulsion. The reactor was heated to 60° C., degassed with argon and allowed to react for 22 hours. The suspension was then allowed to cool to room temperature. The reactor was then emptied and the suspension filtered. The tack and diameter of these hollow microspheres are reported in Table 11.

TABLE 11

| Ex. | Composition | PBW | Tack (g) | Microsphere Diameter (microns) |
|---|---|---|---|---|
| 55 | IOA/AmA/PEO-750 | 96/2/2 | 80 | 40 |

EXAMPLE 56

This example demonstrates the preparation of solid microspheres using a "one-step" method. 0.71 g Lucidol™ 70, 22.5 g of PEO-750 and 15 g of acrylic acid were dissolved in 112.5 g of IOA. 6 g of polyvinyl alcohol (PVOH) [Mw 20,000 and 88 % hydrolyzed] was dissolved in 450 g of D.I. water and charged to a 1 liter baffled reactor. The IOA mixture was then added to the reactor and was stirred at 400 RPM. The reactor was heated to 60° C., degassed with argon and allowed to react for 22 hours. The suspension was then allowed to cool to room temperature. The reactor was then emptied and the suspension filtered. The tack and diameter of these solid microspheres is reported in Table 12.

TABLE 12

| Ex. | Composition | PBW | Tack (g) | Microsphere Diameter (microns) |
|---|---|---|---|---|
| 56 | IOA/AA/PEO-750 | 75/10/15 | 153 | 53 |

EXAMPLE 57

This example demonstrates the preparation of hollow microspheres having pendant oligomeric or polymeric hydrophilic moieties of small diameter. 2.1 g AA, 14.7 g PEO-750, and 0.99 g Lucidol™ 70 were dissolved in 193.2 g IOA. 6.0 g Standapol™ A were dissolved in 390 g D.I. water. The IOA/AA/PEO-750 mixture was then added to the aqueous surfactant solution and emulsified in an Omni™ Mixer until the droplet size was approximately 5 microns as observed by an optical microscope. The emulsion was then charged to a 1 liter baffled reactor, stirred at 400 RPM, and heated to 60° C. The emulsion was then degassed with nitrogen and heated for 22 hours. The tack and diameter of these solid microspheres is reported in Table 13.

TABLE 13

| Example | Composition | PBW | Tack | Diameter |
|---------|-------------|-----|------|----------|
| 57 | IOA/AA/PEO-750 | 93/1/7 | 250 | 5 |

COMPARATIVE EXAMPLE 1

Hollow, tacky acrylate microspheres without pendant oligomeric or polymeric hydrophilic moieties were prepared according to the method of Example 1, except that the hydrophilic component (i.e., PEO-750) was not included. Thus, a 1-liter indented resin flask was charged with 450 ml of deionized water and 6 g of Standapol™ A (ammonium lauryl sulfate commercially available from Henkel, Ga.). The aqueous solution was stirred at 400 rpm, heated to 60° C., and degassed with argon. 150 g of a monomer mixture (i.e., 141 g IOA and 9 g AA) and 0.71 g Lucidol™-70 (70% benzoyl peroxide, commercially available from Atochem North America, Inc.) were added to the hot aqueous surfactant solution. The temperature was then reduced to 60° C. for 22 hours. Upon cooling, a suspension of hollow, tacky acrylate microspheres was obtained.

COMPARATIVE EXAMPLE 2

Solid tacky acrylate microspheres without pendant oligomeric or polymeric hydrophilic moieties were prepared according to their following method. In a one liter reactor equipped with a mechanical stirrer, thermometer and inlet-outlet lines for vacuum and nitrogen, 450 g of D.I. water and 7.5 grams of AA were added. Concentrated sodium hydroxide was added until the pH of the aqueous solution was 7.0. To this solution 1.5 g ammonium lauryl sulfate (Standapol™ A) were added.). 71 g Lucidol™ 70 was dissolved in 137.5 g IOA and the solution added to the reactor while stirring at 350 RPM. A nitrogen purge was applied to the reactor, and the temperature of the reactor was raised to 65° C. and maintained at such temperature for 15 hours. The suspension was then cooled to room temperature and the reactor contents emptied and filtered.

EXAMPLE 58

This example demonstrates the stability of the microspheres of the present invention to coagulation and destabilization by electrolytes. 2 grams of 0.2M $AlCl_3 \cdot 6H_2O$ was added to 20 grams of the representative samples of sterically stabilized microspheres of the present invention (Examples 3 and 4) and ionically stabilized tacky microspheres (Comparative Examples 1 and 2). After 5 minutes, the dispersions were analyzed for coagulation by optical microscopy. The results of this electrolyte stability test are recorded in Table 14.

TABLE 14

| Example | Composition | PBW | Coagulation by Electrolyte |
|---------|-------------|-----|----------------------------|
| 3 | IOA/AA/PEO-750 | 90/5/5 | No |
| 4 | IOA/AA/PEO-750 | 85/5/10 | No |
| Comp. 1 | IOA/AA | 94/6 | Yes |
| Comp. 2 | IOA/NAAA | 95/5 | Yes |

EXAMPLE 59

This example demonstrates the stability of the micro spheres of the present invention to coagulation and destabilization by cycles of freezing and thawing. Representative 10 g samples of sterically stabilized microspheres of the present invention (Examples 3 and 4) and ionically stabilized tacky microspheres (Comparative Example 1 and Comparative Example 2) were submerged and frozen in liquid nitrogen for 5 minutes, then allowed to thaw to room temperature. Once at room temperature, these samples were analyzed for coagulation by optical microscopy. The results of this freeze/thaw stability test are recorded in Table 17.

TABLE 17

| Example | Composition | PBW | Coagulation by Freeze/Thaw |
|---------|-------------|-----|----------------------------|
| 3 | IOA/AA/PEO-705 | 90/5/5 | No |
| 4 | IOA/AA/PEO-750 | 85/5/10 | No |
| Comp. 1 | IOA/AA | 94/6 | Yes |
| Comp. 2 | IOA/NAAA | 95/5 | Yes |

While this invention has been described in terms of specific embodiments it should be understood that it is capable of further modification. The claims herein are intended to cover those variations one skilled in the art would recognize as the chemical equivalent of what has been described here.

We claim:

1. Inherently tacky, polymeric, organic, solvent-insoluble, solvent dispersible, elastomeric, pressure sensitive adhesive microspheres having pendant hydrophilic polymeric or oligomeric moieties having a degree of polymerization greater than or equal to 2; wherein the microspheres once dried will disperse in an organic liquid and wherein the microspheres have diameters of about 1 to about 300 micrometers.

2. Inherently tacky, polymeric, solvent-insoluble, solvent dispersible elastomeric microspheres having pendant hydrophilic polymeric or oligomeric moieties comprising:

100 parts by weight of the polymerization product of:
(a) at least about 30 parts by weight of at least one free radically polymerizable monomer selected from the group consisting of vinyl esters, alkyl acrylate esters, alkyl methacrylate esters, and mixtures thereof, wherein a polymer prepared from said monomers would have a Tg of less than about −10° C.;
(b) about 0 to about 30 parts by weight of at least one polar monomer copolymerizable with the monomer of element (a); and
(c) about 0.5 to about 40 parts by weight of at least one hydrophilic component selected from the group consisting of free radically reactive hydrophilic oligomers and polymers having a degree of polymerization greater than or equal to 2, functionalized derivatives thereof, and mixtures thereof, wherein the microspheres once dried will disperse in an organic liquid and wherein the microspheres have diameters in the range of about 1 to about 300 micrometers.

3. The microspheres of claim 2 wherein said free radically polymerizable monomer is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

4. The microspheres of claim 2 wherein said free radically polymerizable monomer is selected from the group consisting of vinyl 2-ethylhexanoate, vinyl caprate, vinyl laurate, vinyl pelargonate, vinyl hexanoate, vinyl propionate, vinyl decanoate, vinyl octanoate, and mixtures thereof.

5. The microspheres of claim 2 wherein said polar monomer is selected from the group consisting of acrylic acid, methacrylic acid, itaconic acid, crotonic acid, maleic acid, fumaric acid, sulfoethyl methacrylate, sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(2-methacryloxyethyl) ammonium propionate betaine, trimethylamine methacrylimide, 1,1-dimethyl-1-(2,3-dihydroxypropyl)amine methacrylimide, N-vinyl pyrrolidone, N-vinyl caprolactam, oxazolidinone acrylamide, t-butyl acrylamide, dimethyl amino ethyl acrylamide, N-octyl acrylamide, and mixtures thereof.

6. The microspheres of claim 2 wherein said microspheres comprise about 80 to about 95 parts of free radically polymerizable monomer, optionally about 2 to about 17 parts polar monomer, and about 3 to about 18 parts of free radically reactive hydrophilic component.

7. The microspheres of claim 6 wherein said microspheres comprise about 2 to about 17 parts polar monomer.

8. The microspheres of claim 2 wherein said microspheres comprise about 90 to about 95 parts of free radically polymerizable monomer, about 2 to about 5 parts of free radically reactive hydrophilic component, and, optionally, about 3 to about 8 parts of polar monomer.

9. The microspheres of claim 8 which comprise about 3 to about 8 parts polar monomer.

10. The microspheres of claim 2 wherein said hydrophilic component comprise macromonomers of the general formula X—(Y)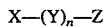—Z wherein:
X is a group that is free radically copolymerizable with the free radically polymerizable monomer and optional polar monomer(s);
y is a divalent linking group;
n is an integer of 0 to 1; and
z is a monovalent hydrophilic polymeric or oligomeric moiety having a degree of polymerization greater than or equal to 2.

11. The microspheres of claim 10 wherein said hydrophilic component is a macromonomer selected from the group consisting of acrylate terminated poly(ethylene oxide), methacrylate terminated poly(ethylene oxide), methoxy poly(ethylene oxide) methacrylate, butoxy poly(ethylene oxide) methacrylate, p-vinyl benzyl terminated poly-(ethylene oxide), acrylate terminated poly(ethylene glycol), methacrylate terminated poly(ethylene glycol), methoxy poly(ethylene glycol) methacrylate, butoxy poly(ethylene glycol) methacrylate, p-vinyl benzyl terminated poly(ethylene glycol), poly(ethylene oxide) diacrylate, poly(ethylene oxide) dimethacrylate, and mixtures thereof.

12. The microspheres of claim 10, wherein:
X represents $H_2C=CR_1$—;
$R_1$ represents —H or —$CH_3$;
Y is a divalent carboxyl group;
n=1; and
Z is a hydrophilic oligomeric or polymeric moiety having a degree of polymerization greater than or equal to 2.

13. The microspheres of claim 10, wherein:
X represents $H_2C=CR_1$—;
$R_1$ represents —H or —$CH_3$;
Y represents

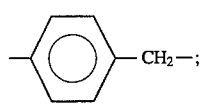

n=1;
Z is a hydrophilic oligomeric or polymeric moiety having a degree of polymerization greater than or equal to 2.

14. The microspheres of claim 1 wherein said microspheres are hollow.

15. The microspheres of claim 1 wherein said microspheres are solid.

16. An aqueous suspension comprising the hollow microspheres of claim 14.

17. An aqueous suspension comprising the solid microspheres of claim 15.

18. A method of making an aqueous suspension of hollow microspheres of claim 16 comprising the steps of (a) forming a water-in-oil emulsion by combining (i) an Aqueous Phase I comprising water and at least one hydrophilic component selected from the group consisting of free radically reactive hydrophilic oligomers and polymers having a degree of polymerization greater than or equal to 2, functionalized derivatives thereof, and mixtures thereof and, optionally, at least one polar monomer with (ii) an Oil Phase II comprising at least one free radically polymerizable monomer selected from the group consisting of alkyl acrylate esters, alkyl methacrylate esters, vinyl esters, and mixtures thereof, wherein a polymer prepared from the monomers have a Tg of less than about −10° C., and wherein the polar monomer is copolymerizable with the free radically polymerizable monomer;

(b) forming a water-in-oil-in-water emulsion by dispersing the water-in-oil emulsion into an aqueous Phase II comprising water and an emulsifier having a hydrophilic-lipophilic balance value of at least about 6; and (c) initiating polymerization;
wherein all or part of the hydrophilic component and, if used, of the polar monomer(s) is alternatively added to the water-in-oil-in-water emulsion after polymerization of the water-in-oil-in-water emulsion is initiated, but before 100% conversion to polymer of the monomers of said water-in-oil-in-water emulsion occurs.

19. A method of making an aqueous suspension of hollow microspheres of claim 16 comprising the steps of (a) forming a water-in-oil emulsion by combining (i) an Aqueous Phase I comprising water and, optionally, at least one polar monomer, and (ii) an Oil Phase II comprising a free radically polymerizable monomer selected from the group consisting of vinyl esters, alkyl acrylate esters, alkyl methacrylate esters, and mixtures thereof, and at least one hydrophilic component selected from the group consisting of free radically reactive hydrophilic oligomers and polymers having a degree of polymerization greater than or equal to 2, functionalized derivatives thereof, and mixtures thereof;

(b) forming a water-in-oil-in-water emulsion by dispersing the water-in-oil emulsion into an Aqueous Phase II comprising water and an emulsifier having a hydrophilic-lipophilic balance value of at least about 6; and (c) initiating polymerization;

wherein all or part of the hydrophilic component and, if used, of the polar monomer(s) is alternatively added to the water-in-oil-in-water emulsion after polymerization of the water-in-oil-in-water emulsion is initiated, but before 100% conversion to polymer of the monomers of said water-in-oil-in-water emulsion occurs.

20. A method of making an aqueous suspension of hollow microspheres of claim 16 comprising the steps of:

(a) forming droplets by mixing in any order together
  (i) at least one free radically polymerizable monomer selected from the group consisting of vinyl esters, alkyl acrylate esters, alkyl methacrylate esters, and mixtures thereof, wherein a polymer prepared from the monomer(s) would have a Tg of less than about $-10°$ C.;
  (ii) optionally, at least one polar monomer copolymerizable with the free radically polymerizable monomer;
  (iii) at least one hydrophilic component selected from the group consisting of free radically reactive hydrophilic oligomers and polymers having a degree of polymerization greater than or equal to 2, functionalized derivatives thereof, and mixtures thereof,
  (iv) at least one emulsifier which is capable of forming a water-in-oil emulsion inside the droplets, the emulsion being substantially stable during emulsification and polymerization, and
  (v) an aqueous medium; and, (b) initiating polymerization.

21. A method of making an aqueous suspension of hollow microspheres of claim 16 comprising the steps of:

(a) forming droplets by mixing together
  (i) at least one free radically polymerizable monomer selected from the group consisting of vinyl esters, alkyl acrylate esters, alkyl methacrylate esters, and mixtures thereof, wherein a polymer prepared from the monomer(s) would have a Tg of less than about $-10°$ C.,
  (ii) optionally a portion of at least one hydrophilic component selected from the group consisting of free radically reactive hydrophilic oligomers and polymers having a degree of polymerization greater than or equal to 2, functionalized derivatives thereof, and mixtures thereof, and optionally a portion, if used, of at least one polar monomer copolymerizable with the free radically polymerizable monomer,
  (iii) at least one emulsifier which is capable of forming a water-in-oil emulsion inside the droplets, the emulsion being substantially stable during emulsification and polymerization, and
  (iv) an aqueous medium;

(b) initiating polymerization; and, (c) adding all or the remaining portion of polar monomer(s), if used, and all or the remaining portion of the hydrophilic component prior to the 100% conversion to polymer of the monomer contained in the droplets.

22. A method of making an aqueous suspension of solid microspheres of claim 17 comprising the steps of:

(a) forming droplets by mixing together:
  (i) at least one free radically polymerizable monomer selected from the group consisting of vinyl esters, alkyl acrylate esters, alkyl methacrylate esters, and mixtures thereof, wherein a polymer prepared from the monomer would have a Tg of less than about $-10°$ C.,
  (ii) optionally, at least one polar monomer copolymerizable with the free radically polymerizable monomer:
  (iii) at least one hydrophilic component selected from the group consisting of free radically reactive hydrophilic polymer(s) and oligomer(s) having a degree of polymerization greater than or equal to 2, functionalized derivatives thereof, and mixtures thereof:
  (iv) at least one suspension stabilizer; and
  (v) an aqueous medium; and, (b) initiating polymerization; and (c) adding all or the remaining portion of polar monomer(s), if used, and all or the remaining portion of the hydrophilic component prior to the 100% conversion to polymer of the monomer contained in the droplets.

23. A sheet material having coated there on at least a portion thereof the pressure-sensitive adhesive microspheres of claim.

24. A sheet material having coated thereon at least a portion thereof the pressure-sensitive adhesive microspheres of claim 2.

25. A pressure-sensitive adhesive comprising the hollow microspheres of claim 14.

26. A pressure-sensitive adhesive comprising the solid microspheres of claim 15.

27. A sheet material having coated on at least a portion thereof the pressure-sensitive adhesive of claim 25.

28. A sheet material having coated on at least a portion thereof the pressure-sensitive adhesive of claim 26.

29. The coated sheet material of claim 23 wherein a release agent is coated on one side of the sheet and the adhesive is coated on the other side.

30. The coated sheet material of claim 29 wound convolutely on itself about a core to form a roll.

31. A transfer tape comprising the pressure-sensitive adhesive microspheres of claim 1 coated between two release liners.

32. A double coated tape comprising a flexible backing member having two surfaces and the pressure-sensitive adhesive of claim 1 coated on both of said surfaces.

33. A tape comprising a flexible backing member, the pressure-sensitive adhesive of claim 1 coated on one side of the backing member and a flexible release liner covering the pressure-sensitive adhesive.

34. The coated sheet material of claim 23 wherein said substrate is selected from the group consisting of paper, plastic foams, cellulose acetate, ethyl cellulose, fabrics, metal, metallized polymeric film, and ceramic sheet material.

35. A spray pressure-sensitive adhesive comprising the microspheres of claim 1 and a liquid medium therefor.

36. A spray pressure sensitive-adhesive comprising the hollow microspheres of claim 14 and a liquid medium therefor.

37. The spray pressure-sensitive adhesive of claim 36 which further comprises a propellant selected from the group consisting of alkanes, alkenes, and chlorofluorocarbons.

38. A spray pressure sensitive-adhesive comprising the solid microspheres of claim 15 and a liquid medium therefor.

39. The spray pressure-sensitive adhesive of claim 38 which further comprises a propellant selected from the group consisting of alkanes, alkenes, and chlorofluorocarbons.

40. The microspheres of claim 1 wherein said microspheres have diameters of about 1 to about 300 microns.

41. A coated sheet material comprising a water dispersible substrate coated with the micro spheres of claim 1.

* * * * *

UNITED STATES PATENT AND TRADEMARK OFFICE
CERTIFICATE OF CORRECTION

PATENT NO. : 5,508,313
DATED : April 16, 1996
INVENTOR(S) : Joaquin Delgado, Richard J. Goetz, and Spencer F. Silver It is certified that error appears in the above-identified patent and that said Letters Patent is hereby corrected as shown below:

Column 24, line 29, "of claim." should read --of claim 1.--; and

Column 26, line 6, "micro spheres" should read --microspheres--.

Signed and Sealed this

Twentieth Day of July, 1999

Attest:

Q. TODD DICKINSON

Attesting Officer     Acting Commissioner of Patents and Trademarks